United States Patent
Östrup et al.

(10) Patent No.: US 7,983,183 B2
(45) Date of Patent: Jul. 19, 2011

(54) METHOD AND ARRANGEMENT FOR MEASURING TRANSMISSION QUALITY IN A PACKET MODE COMMUNICATION NETWORK

(75) Inventors: Nils Peter Östrup, Linköping (SE); Kjell Anders Westroos, Rimforsa (SE); Jonas Waldeck, Ljungsbro (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 449 days.

(21) Appl. No.: 12/064,465

(22) PCT Filed: Aug. 23, 2005

(86) PCT No.: PCT/SE2005/001224
§ 371 (c)(1),
(2), (4) Date: Aug. 22, 2008

(87) PCT Pub. No.: WO2007/024161
PCT Pub. Date: Mar. 1, 2007

(65) Prior Publication Data
US 2009/0196189 A1    Aug. 6, 2009

(51) Int. Cl.
*G01R 31/08* (2006.01)

(52) U.S. Cl. .......... 370/252; 370/229; 370/235

(58) Field of Classification Search .......... 370/252, 370/332, 235; 714/781
See application file for complete search history.

(56) References Cited

U.S. PATENT DOCUMENTS

| | | | |
|---|---|---|---|
| 6,757,248 B1 * | 6/2004 | Li et al. | 370/235 |
| 6,771,607 B1 * | 8/2004 | Russell et al. | 370/252 |
| 6,868,094 B1 | 3/2005 | Bordonaro | |
| 7,009,951 B2 * | 3/2006 | Kalliokulju et al. | 370/331 |
| 7,606,203 B1 * | 10/2009 | Shabtay et al. | 370/332 |
| 2003/0066016 A1 * | 4/2003 | Wehage | 714/781 |
| 2005/0039103 A1 | 2/2005 | Azenko et al. | |
| 2006/0168343 A1 * | 7/2006 | Ma et al. | 709/245 |

FOREIGN PATENT DOCUMENTS

| | | |
|---|---|---|
| JP | 2004-172706 | 6/2004 |
| WO | WO 01/28180 A2 | 4/2001 |
| WO | WO 2005/004370 | 4/2005 |

\* cited by examiner

*Primary Examiner* — Ricky Ngo
*Assistant Examiner* — David Oveissi

(57) ABSTRACT

A method and an arrangement for measuring a transmission quality in terms of lost packets between two pre-determined nodes arranged to transmit and receive packets in a packet mode communication network. Each node is provided with a counter arranged to count transmitted packets in one node and received packets in the other node during a pre-determined period of time. After the pre-determined period of time has ended, the counters are compared in order to obtain a packet loss measurement.

9 Claims, 2 Drawing Sheets

METHOD AND ARRANGEMENT FOR MEASURING TRANSMISSION QUALITY IN A PACKET MODE COMMUNICATION NETWORK

TECHNICAL FIELD

The present invention relates to the field of packet mode communication networks and, particularly, to an arrangement allowing for measuring the transmission quality in terms of lost packets in a packet mode communication network as well as a method for such measuring.

BACKGROUND OF THE INVENTION

Packet mode communication networks transmit information/data in the form of packets. One example of such a network is the Internet network which is operated with IP protocol (Internet protocol). IP is used for transmitting data from higher-level protocols, such as TCP and UDP, in IP packets from one host to another host in the network. Each packet is handled independent of other packets and each packet may reach the destination through different network routes. The communication services, such as voice/sound or visual communications, require a certain level of quality across the IP network.

One prior art approach of determining quality for packetized information is shown in WO 2005/004370, which discloses a method for near real time analysis which samples packets from a stream of IP packets that represent a communication session between a pair of endpoints and determines two metrics from the sampled packets, quantity of lost packets and packet timing. The packet loss is calculated by looking at the RTP sequence number in each packet. Gaps in the sequence represent lost packets and the packet loss is calculated as the number of lost packets divided by the sum of received packets plus lost packets.

However, this prior art approach measures the quality of the network in a complicated manner involving several metrics to consider. Additionally, protocols like RTP require large headers of the packets, typically 12 octets for the RTP protocol, which is capacity consuming. Other existing solutions in this area involve hardware (HW) that is costly.

There is, thus, today no cheap, easy way for two peer endpoints of an IP transmission network to know the overall transmission quality of the intermediary IP network connecting them.

SUMMARY OF THE INVENTION

Accordingly, it is an objective with the present invention to provide an improved method for measuring a transmission quality in terms of lost packets between two pre-determined nodes arranged to transmit and receive packets in a packet mode communication network.

This objective is achieved through a method of providing each node with a counter whereby each node is able to reset the counter on the other node, counting transmitted packets in one node and received packets in the other node during a pre-determined period of time and, comparing the counters after the pre-determined period of time has ended in order to obtain a packet loss measurement.

Another objective with the present invention is to provide an improved arrangement for measuring a transmission quality in terms of lost packets between two pre-determined nodes arranged to transmit and receive packets in a packet mode communication network.

This other objective is achieved through providing an arrangement comprising a counter in each node arranged to count transmitted packets in one node and received packets in the other node during a pre-determined period of time, where each node is arranged to be able to reset the counter on the other node and, means for comparing the counters after the pre-determined period of time has ended in order to obtain a packet loss measurement.

One advantage with the present invention is the possibility to identify, in a relatively easy manner, weaknesses in an intermediary IP network that effects the performance of end user applications. Another advantage is the possibility to dimension the intermediary IP network such, that it shall not be a bottleneck.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF PREFERRED EMBODIMENTS

The Global System for Mobile Communication (GSM) is one of the most widely deployed communication standards for mobile wireless communication. As an extension of GSM in order to introduce packet-switched technology, General Packet Radio Service (GPRS) was developed by Third Generation Partnership Project (3GPP). One limitation of GPRS is that it does not support voice services. Therefore, the European Telecommunications Standards Institute (ETSI) has developed a new standard for GSM to support high rate data services. This standard is known as Enhanced Data Rates for Global Evolution (EDGE). One objective of EDGE is to provide voice services over the packet-switched network.

A network according to these standards comprises a core network (CN), radio access networks (RAN) and mobile stations (MS) attached to a RAN, such as the GSM/EDGE Radio Access Network (GERAN) architecture. This kind of network is basically an extension of Internet and supports IP in all instances from the mobile station to the core network.

Figure 1:
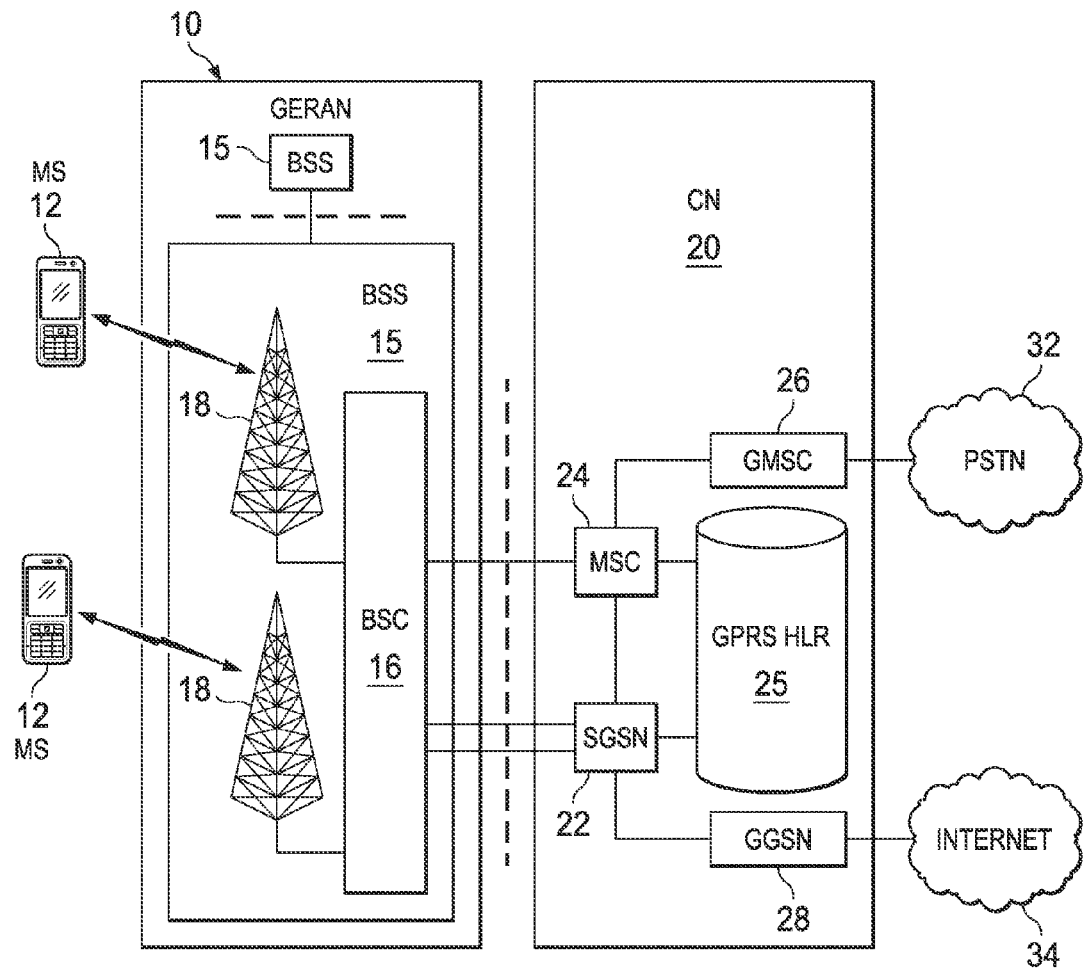
FIG. 1 is an exemplary block diagram of a mobile communication network.

A block diagram of an exemplary 3GPP GSM system network is shown in FIG. 1. The network comprises a radio access network (RAN), which in the preferred embodiment of the present invention is a GSM/EDGE Radio Access Network (GERAN) 10 and a core network (CN) 20. The GERAN 10 and the CN 20 provide communication and control for a plurality of mobile stations (MS) 12.

The GERAN architecture 10 comprises a plurality of Base Station Systems (BSS) 15 each controlled by a Base Station Controller (BSC) 16 which is connected to a set of Base Transciever Stations (BTS) 18. The BTSs 18 comprise the antennas, RF equipment and baseband processing circuits needed to communicate with the MSs 12. The BTSs 18 are connected to the BSC 16 through the Abis-interface.

The core network 20 typically comprises at least one Serving GPRS Support Node (SGSN) 22, one or more Gateway GPRS Support Node (GGSN) 28, at least one mobile switching center (MSC) 24, which may include a visitor location register (VLR) (not shown in FIG. 1), a Gateway MSC (GMSC) 26, and a GPRS home location register (HLR) 25. The CN 20 provides both circuit-switched and packet data communication with various external networks, typically including the Public Switched Telephone Network (PSTN) 32 and one or more packet mode communication network, such as the Internet 34. The GERAN 10 connects to the CN 20 through the A, Gb and Iu interfaces.

In the present invention a test function is added on each side of an intermediary IP network between two nodes in a packet mode communication network, in order to measure the overall quality of the intermediary IP network. The test function is a duplex function and is able to measure the quality of the intermediary IP network in both directions independently of each other. The quality is measured as the number of packets that is lost in the intermediary IP network between the two sides during a pre-determined period of time, i.e. the test period, and thus a counter is provided on each side of the intermediary IP network to be measured.

The side that is sending the measured IP packets is in this context called the originating side and the side that is receiving the measured IP packets is called the terminating side. The test function may be initiated on one or both sides of the intermediary IP network that shall be measured, but shall always be initiated on the terminating side of the measured IP network before it is initiated on the originating side.

The test function arrangement according to the present invention for measuring a transmission quality in terms of lost packets between two pre-determined nodes arranged to transmit and receive packets in a packet mode communication network, thus comprises:

- a counter in each node arranged to count transmitted packets in one node and received packets in the other node during a pre-determined period of time, where each node is arranged to be able to reset the counter on the other node;
- means for setting a testbit in each transmitted packet in order to indicate to the terminating side (receiving node) that the packet has been counted on the originating side (transmitting node), whereby the terminating side increases the counter for each received packet where said testbit is set;
- means for setting said testbit to zero after the pre-determined period of time has ended in order to indicate to the terminating side that the received packet not has been counted on the originating side;
- means for comparing the counters after the pre-determined period of time has ended in order to obtain a packet loss measurement. The originating side is arranged to fetch the packet received counter value from the terminating side so, that the counters from each side of the interface can be compared towards each other to identify the experienced packet loss. Optionally, the comparison may either be made manually or, the terminating side may send a message including the local counter value from the terminating side to the originating side when packets with said testbit set to zero have been received for a pre-determined period of time on the terminating side.

The terminating side may be arranged to forward the received packets to another node. In order not to pollute the IP network that may be present after the terminating side of the test function, the terminating side has to set the testbit in the received packet to zero before forwarding the packet to the other node. In this way, the test function may be initiated on separate parts of an overall IP network without interfering with each other's measurement results. If the complete IP network is to be measured, i.e. if the two nodes to be measured are two endpoints, the routers/switches in the network must be coordinated so that the test function is not activated in any of those nodes, i.e. the counters at the intermediary nodes are deactivated.

Figure 2:
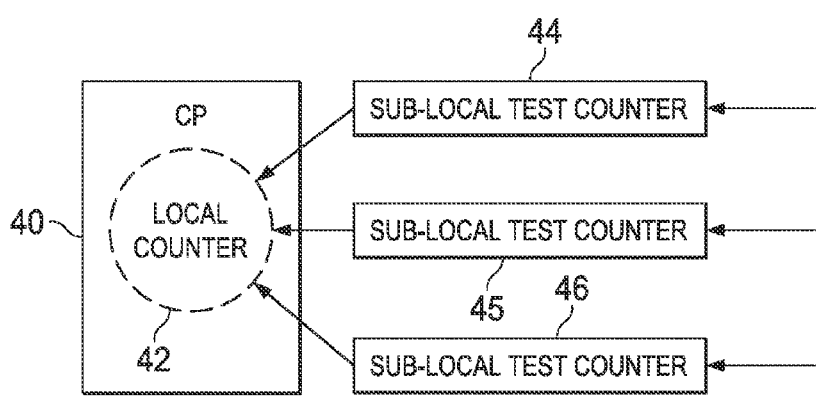
FIG. 2 is a block diagram showing an embodiment of the present invention where a terminating side comprises several hardware entities.

The terminating side may comprise several HW entities on which IP packets may be received, thus making aggregation of sub-local counters necessary. This is shown in FIG. 2. FIG. 2 shows a Central Processor (CP) 40 comprising the local counter 42 of the terminating side. IP packets from the remote side are counted in sub-local test counters 44, 45 and 46 provided in Regional Processors (RP). The aggregation of the sub-local counters 44, 45 and 46 into the local counter 42 may either be done in real-time through the test period or after the test period has ended. It is possible to measure the quality of the intermediary IP network to a subset of HW devices each equipped with an IP address, by letting the originating side set the testbit and count only in those packets sent to a specific HW entity.

In a preferred embodiment of the present invention, the procedure on the originating side for measuring the transmission quality in terms of lost packets from the originating side provided with a counter to the terminating side provided with a counter during a pre-determined period of time (test period), shown in FIG. 3 on the right hand side, is as follows:

- initiating the test function (step 51) by resetting counters in originating and terminating sides;
- sending packets to terminating side and increasing the counter for each packet sent to the terminating side (step 52) and setting a testbit in each transmitted packet in order to indicate to the terminating side that the packet has been counted in the originating side;
- deactivating the test function by setting the testbit to zero (step 53) after the pre-determined period of time has ended in order to indicate to the terminating side that the received packet not has been counted on the originating side;
- optionally, fetching the packet received counter value from the terminating side after the pre-determined period of time has ended;
- comparing the counters (step 54) in order to obtain a packet loss measurement. Alternatively, the comparison is made manually or the terminating side may send a message including the local counter value from the terminating side to the originating side when packets with said testbit set to zero have been received for a pre-determined period of time on the terminating side.

In a preferred embodiment of the present invention, the procedure on the terminating side for measuring the transmission quality in terms of lost packets from the originating side to the terminating side during a pre-determined period of time (test period), shown in FIG. 3 on the left hand side, is as follows:

- initiating the test function on request from originating side;
- receiving packets from the originating side and increasing counter for all downlink packets (received packets) with testbit set (step 55);
- optionally, sending a message including the counter value from the terminating side to the originating side when packets with said testbit set to zero have been received for a pre-determined period of time (not specifically shown in FIG. 3), to enable comparison of the counters (step 54). Alternatively, the comparison is made manually or the originating side is arranged to fetch the packet received counter value from the terminating side as described above.

A first preferred embodiment of the present invention for measuring the transmission quality in terms of lost packets between two nodes arranged to transmit and receive packets in a packet mode communication network, concerns the 3GPP GSM system (shown in FIG. 1) and the Gb-interface which connects a GSM/EDGE Radio Access Network (GE-RAN) to a core network (CN). There is today no way to know how much data that is lost in the intermediary IP network between the SGSN 22 and the BSS 15, i.e. the Gb-interface. Each side of the Gb-interface may very well consist of a number of HW entities all equipped with an IP address, between which there is full mesh connectivity, which complicates the problem with measuring the overall quality of the intermediary IP network on the application layer, which is the Network Service (NS) layer.

In the first preferred embodiment of the present invention, a Network Service (NS) entity may decide to measure the packet loss in the intermediary IP network, operated with IP protocol, towards its peer entity. It can do so between one or more of its local endpoints towards one or more of its remote IP endpoints. Each local IP endpoint implements a Packet Sent Counter and each remote IP endpoint implements a Packet Received Counter and these counters are used for comparison after the test period has ended in accordance with the present invention.

The IP Endpoint Information Reset procedure is used to initiate the packet loss measurement function in the remote peer NS entity, i.e. the Packet Received Counter of all indicated local IP endpoints configured in the peer NS entity are reset. Optionally, all local IP endpoints are reset, not only the indicated local IP endpoints. When the packet loss measurement function has been initiated in the remote peer NS entity, the Packet Received Count bit is set to "request counting" in all NS Protocol Data Units (NS-PDUs) sent to the IP endpoints of the remote peer NS entity that are to be measured. Before sending an NS-PDU to such an IP endpoint, the sending side shall increase its Packet Sent Counter for the sending IP endpoint. At the receiving NS entity, the Packet Received Counter is increased for every received NS-PDU where the Packet Received Count bit is set to "request counting".

After a completed test period, the packet loss measurement function is switched off, meaning that the Packet Received Count bit is set to "no counting" in all NS-PDUs sent to the remote peer NS entity. At the receiving NS entity, the Packet Received Counter is not increased when an NS-PDU is received where the Packet Received Count bit is set to "no counting". The Packet Received Counters from the peer NS entity are fetched with the IP Endpoint Information procedure. The actual packet loss experienced during a test period is found through comparing the Packet Sent/Received Counters from each side of the interface.

In a second preferred embodiment of the present invention, the inventive method for measuring the transmission quality in terms of lost packets is implemented in the Abis-interface, i.e. between the BTSs 18 and the BSC 16.

In a third preferred embodiment of the present invention, the inventive method for measuring the transmission quality in terms of lost packets is implemented in the Iu-interface, between the SGSN 22 and a Radio Network Controller (RNC) which is used in a Universal Terrestrial RAN (UT-RAN) architecture.

In a fourth preferred embodiment of the present invention, the inventive method for measuring the transmission quality in terms of lost packets is implemented in the A-interface, i.e. between the MSC 24 and the BSS 15.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for measuring a transmission quality in terms of lost packets between two pre-determined nodes arranged to transmit and receive packets in a packet mode communication network, said method comprising the steps of:
   providing each node with a counter, whereby each node is able to reset the counter on the other node;
   counting transmitted packets in one node and received packets in the other node during a pre-determined period of time, wherein the step of counting comprises the steps of:
      setting a testbit in each transmitted packet in order to indicate to the receiving node that the packet has been counted in the transmitting node, whereby the receiving node increases the counter for each received packet where said testbit is set; and,
      setting said testbit to zero after the pre-determined period of time has ended in order to indicate to the receiving node that the received packet has not been counted on the transmitting node
   comparing the counters after the pre-determined period of time has ended in order to obtain a packet loss measurement, wherein the step of comparing comprises the step of sending a message including the counter value from the receiving node to the transmitting node when packets with said test bit set to zero have been received for a pre-determined period of time.

2. The method according to claim 1, wherein said receiving node is arranged to forward the received packets to still another node, wherein the method further comprises the step of setting said received test bit to zero before forwarding the packet to said still another node.

3. An arrangement for measuring a transmission quality in terms of lost packets between two pre-determined nodes arranged to transmit and receive packets in a packet mode communication network, said arrangement comprising:
   a counter in each node arranged to count transmitted packets in one node and received packets in the other node during a pre-determined period of time, wherein each node is arranged to be able to reset the counter on the other node;

means for comparing the counters after the pre-determined period of time has ended in order to obtain a packet loss measurement;

means for setting a test bit in each transmitted packet in order to indicate to the receiving node that the packet has been counted in the transmitting node, whereby the receiving node increases the counter for each received packet where said test bit is set; and, means for setting said test bit to zero after the pre-determined period of time has ended in order to indicate to the receiving node that the received packet has not been counted on the transmitting node; and means for sending a message including the counter value from the receiving node to the transmitting node when packets with said test bit set to zero have been received for a pre-determined period of time.

4. The arrangement according to claim 3, wherein said receiving node is arranged to forward the received packets to still another node, wherein the arrangement further comprises means for setting said received test bit to zero before forwarding the packet to said another node.

5. The arrangement according to claim 3, wherein said packet mode communication network is an intermediary transmission network operated with an Internet Protocol (IP).

6. The arrangement according to claim 3, wherein said packet mode communication network is an intermediary transmission network on a Gb-interface connecting a GSM/EDGE Radio Access Network (GERAN) to a core network (CN), wherein said two pre-determined nodes are a Base Station System (BSS) and a Serving GPRS Support Node (SGSN).

7. The arrangement according to claim 3, wherein said packet mode communication network is an intermediary transmission network on an Abis-interface connecting a Base Station Controller (BSC) with at least one Base Transciever Station (BTS), wherein said two pre-determined nodes are said Base Station Controller (BSC) and said Base Transciever Station (BTS).

8. The arrangement according to claim 3, wherein said packet mode communication network is an intermediary transmission network on a Iu-interface connecting a Universal Terrestrial Radio Access Network (UTRAN) to a core network (CN), wherein said two pre-determined nodes are a Radio Network Controller (RNC) and a Serving GPRS Support Node (SGSN).

9. The arrangement according to claim 3, wherein said packet mode communication network is, an intermediary transmission network on an A-interface connecting a GSM/EDGE Radio Access Network (GERAN) to a core network (CN), wherein said two pre-determined nodes are a Base Station System (BSS) and a Mobile Switching Center (MSC).

* * * * *

UNITED STATES PATENT AND TRADEMARK OFFICE
CERTIFICATE OF CORRECTION

PATENT NO. : 7,983,183 B2  
APPLICATION NO. : 12/064465  
DATED : July 19, 2011  
INVENTOR(S) : Ostrup et al.

Page 1 of 1

It is certified that error appears in the above-identified patent and that said Letters Patent is hereby corrected as shown below:

Title Page, in the Figure, for Tag "53", Line 1, delete "TESBIT" and insert -- TESTBIT --, therefor.

Figure 3:
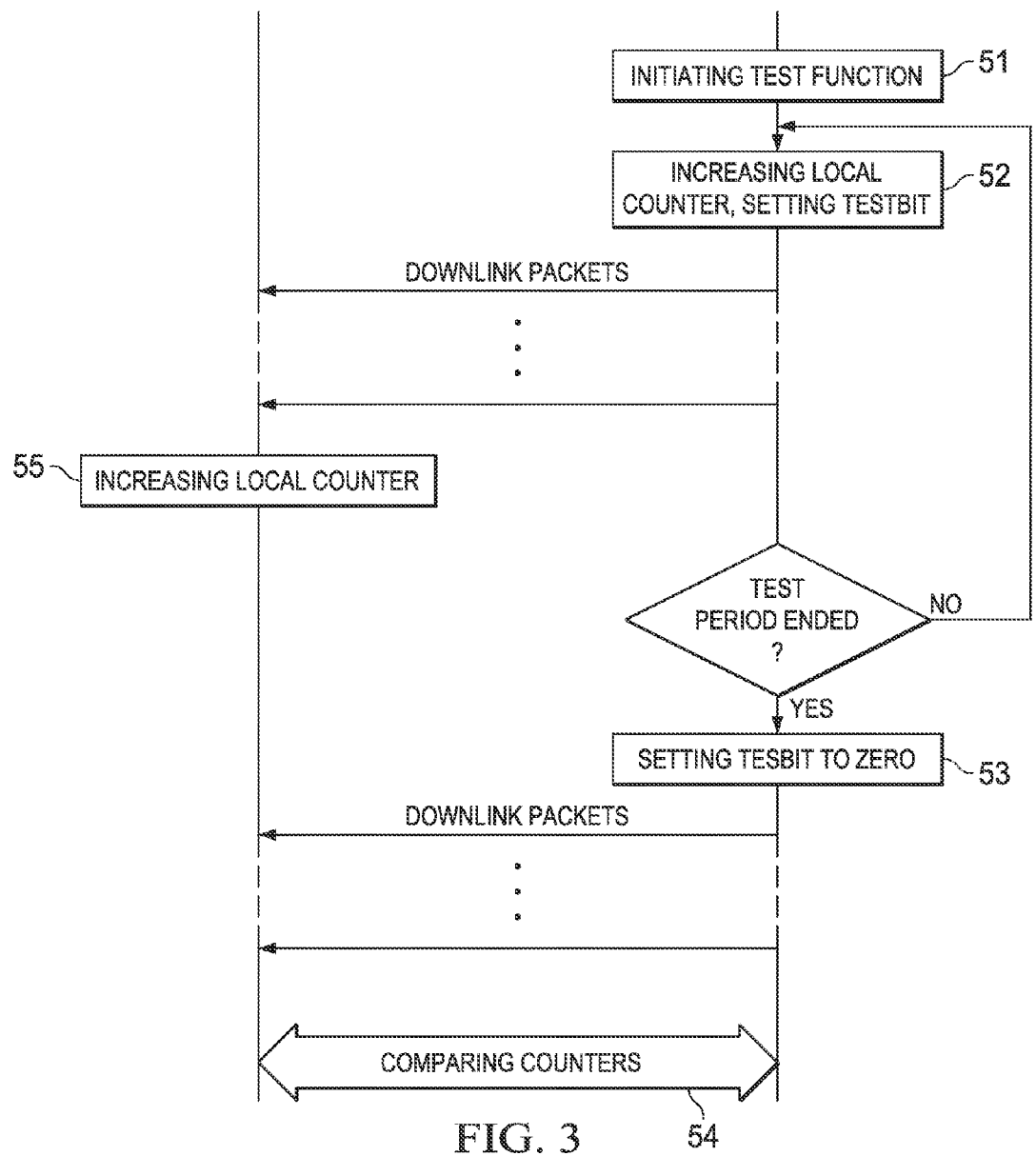
FIG. 3 is a flow chart showing the inventive method steps on both an originating and a terminating side.

In Fig. 3, Sheet 2 of 2, for Tag "53", Line 1, delete "TESBIT" and insert -- TESTBIT --, therefor.

In Column 3, Line 2, delete "Transciever" and insert -- Transceiver --, therefor.

In Column 8, Line 9, in Claim 7, delete "Transciever" and insert -- Transceiver --, therefor.

In Column 8, Line 11, in Claim 7, delete "Transciever" and insert -- Transceiver --, therefor.

In Column 8, Line 21, in Claim 9, delete "is," and insert -- is --, therefor.

Signed and Sealed this  
Twenty-second Day of November, 2011

David J. Kappos  
*Director of the United States Patent and Trademark Office*